H. WEHLER.
Thrashing-Machines.
No. 139,218. Patented May 20, 1873.
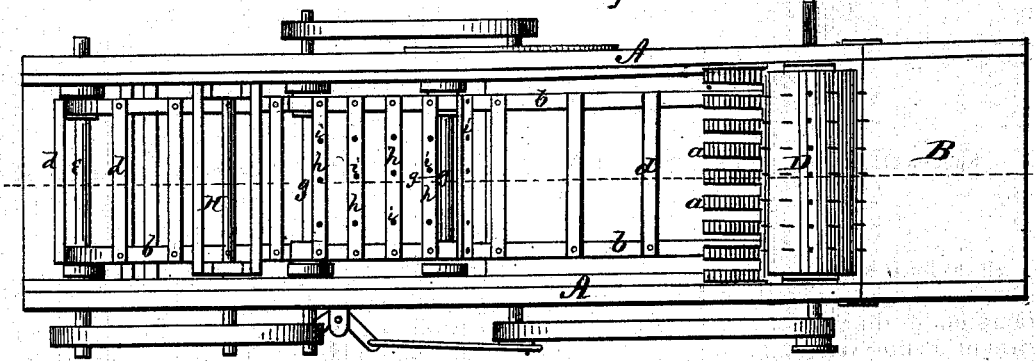
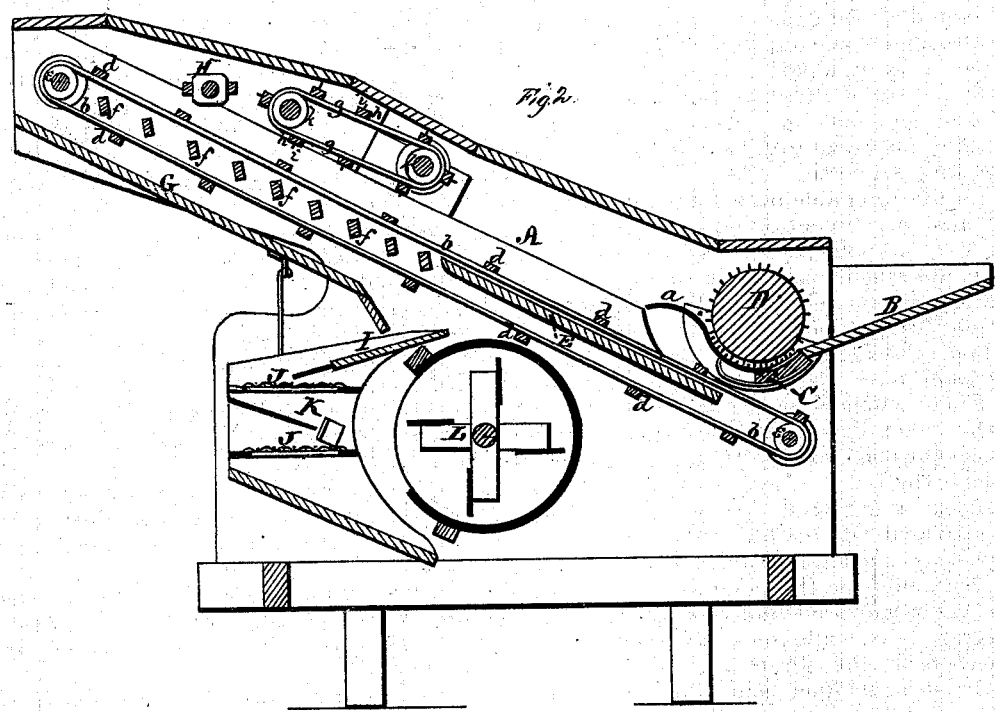
Witness:
Jas. E. Hutchinson
C. L. Everit
Inventor.
Harvey Wehler
per Alexander Mahon
Attorneys.

UNITED STATES PATENT OFFICE.

HARVEY WEHLER, OF HAMPTON, PENNSYLVANIA.

IMPROVEMENT IN THRASHING-MACHINES.

Specification forming part of Letters Patent No. 139,218, dated May 20, 1873; application filed March 12, 1873.

*To all whom it may concern:*

Be it known that I, HARVEY WEHLER, of Hampton, in the county of Adams and in the State of Pennsylvania, have invented certain new and useful Improvements in Grain-Separator; and do hereby declare that the following is a full, clear, and exact description thereof, reference being had to the accompanying drawing and to the letters of reference marked thereon making a part of this specification.

The nature of my invention consists in the construction and arrangement of a grain thrasher and separator, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a longitudinal vertical section, of my machine.

A represents the frame of my machine, at one end of which is the feed-table B. Directly at the inner end of the feed-table B commences the concave C, with thrashing-cylinder D above the same. These parts are constructed and arranged, and the concave and cylinder provided with teeth or spikes, in the same manner as is usual for such machines. Along the rear edge of the concave C are formed curved teeth or projections $a\ a$, between which the grain falls, while the straw passes over the same. Both the grain and the straw fall down upon an inclined board, E, and are carried up the same by means of the endless carrier $b\ d$. This endless carrier consists of two endless belts, $b\ b$, passing around rollers $e\ e$, and connected by means of strips or bars $d\ d$, and said carrier passes close onto the upper side of the inclined board E. After the grain and straw have been carried by the carrier $b\ d$ to and above the upper edge of the inclined board E, the grain falls down between a series of inclined slats, $f\ f$, onto another inclined board, G, while the straw is picked up by a toothed carrier, $g\ h$, and carried over the same, when a revolving beater, H, throws it off from the same, and allows it to pass out at the upper rear end of the machine. The toothed carrier $g\ h$ consists of two endless belts, $g\ g$, passing around two rollers, $k\ k$, and connected by strips or slats $h\ h$, each strip or slat provided with teeth $i\ i$. This carrier is located above, and revolves in the same direction as, the main carrier $b\ d$, so that the lower part of the carrier $g\ h$ will run in the opposite direction from that of the upper part of the carrier $b\ d$.

The grain, after having fallen through between the slats $f\ f$ onto the inclined board G, falls onto an inclined board, I, in a vibrating shoe, K, arranged within the frame A, and from said inclined board over and through sieves J J, being thereby separated from all foreign seed and substances, and at the same time cleaned from all chaff, &c., by the blast from the fan L.

Having thus fully described my invention, what I claim as new, and desire to secure by Letters Patent, is—

1. The straw-carrier $g\ h$, constructed and operated substantially as described, in combination with the carrier $b\ d$, all substantially as set forth.

2. The combination of the two carriers $b\ d$ and $g\ h$, constructed and operated as described, with the beater H, all as and for the purposes set forth.

3. In combination with the carriers and beater, constructed and operated as described, the shoe or separator, as and for the purposes set forth.

In testimony that I claim the foregoing I have hereunto set my hand this 28th day of February, 1873.

HARVEY WEHLER.

Witnesses:
A. N. MARR,
C. L. EVERT.